United States Patent
Jang

(10) Patent No.: US 11,735,722 B2
(45) Date of Patent: Aug. 22, 2023

(54) METHOD OF PRODUCING CONDUCTING POLYMER NETWORK-ENABLED PARTICULATES OF ANODE ACTIVE MATERIAL PARTICLES FOR LITHIUM-ION BATTERIES

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

(\*) Notice: Subject to any disclaimer, the term of this patent is extended or adjusted under 35 U.S.C. 154(b) by 69 days.

(21) Appl. No.: 16/380,336

(22) Filed: Apr. 10, 2019

(65) Prior Publication Data
US 2020/0328407 A1 Oct. 15, 2020

(51) Int. Cl.
| | | |
|---|---|---|
| H01M 4/36 | (2006.01) | |
| H01M 4/133 | (2010.01) | |
| H01M 4/134 | (2010.01) | |
| H01M 4/131 | (2010.01) | |
| H01M 4/62 | (2006.01) | |
| H01M 4/04 | (2006.01) | |

(Continued)

(52) U.S. Cl.
CPC ......... *H01M 4/366* (2013.01); *H01M 4/0404* (2013.01); *H01M 4/0466* (2013.01); *H01M 4/131* (2013.01); *H01M 4/133* (2013.01); *H01M 4/134* (2013.01); *H01M 4/622* (2013.01); *H01M 10/0525* (2013.01); *H01M 2004/021* (2013.01)

(58) Field of Classification Search
CPC ....... H01M 10/0525; H01M 2004/021; H01M 2004/027; H01M 4/0404; H01M 4/0466; H01M 4/131; H01M 4/133; H01M 4/134; H01M 4/136; H01M 4/366; H01M 4/622; H01M 4/624; H01M 4/625
See application file for complete search history.

(56) References Cited

U.S. PATENT DOCUMENTS

| | | |
|---|---|---|
| 2,798,878 A | 7/1957 | Hummers |
| 10,122,044 B2 | 11/2018 | Tan et al. |
| 2004/0018430 A1 | 1/2004 | Holman et al. |

(Continued)

FOREIGN PATENT DOCUMENTS

| | | | |
|---|---|---|---|
| CN | 108232138 A | 6/2018 | |
| EP | 3086388 A1 * | 10/2016 | ............. B82Y 30/00 |

OTHER PUBLICATIONS

M. Ge, X. Fang, J. Rong, C. Zhou. Review of porous silicon preparation and its application for lithium-ion battery anodes, Nanotechnology 24 (2013) 422001.*

(Continued)

*Primary Examiner* — Carlos Barcena

(57) ABSTRACT

Provided is method of producing graphene-embraced anode particulates for a lithium battery, the method comprising: (A) providing anode active material-decorated carbon or graphite particles, wherein the carbon or graphite particles have a diameter or thickness from 500 nm to 50 μm and the anode active material, in a form of particles or coating having a diameter or thickness from 0.5 nm to 2 μm, is bonded to surfaces of the carbon or graphite particles; and (B) embracing the anode active material-decorated carbon or graphite particles with a shell comprising multiple graphene sheets to produce the graphene-embraced anode particulates.

15 Claims, 6 Drawing Sheets

(51) Int. Cl.
*H01M 10/0525* (2010.01)
*H01M 4/02* (2006.01)

(56) References Cited

U.S. PATENT DOCUMENTS

| | | |
|---|---|---|
| 2005/0136330 A1 | 6/2005 | Mao et al. |
| 2008/0050658 A1 | 2/2008 | Abe et al. |
| 2011/0165466 A1 | 7/2011 | Zhamu et al. |
| 2012/0064409 A1 | 3/2012 | Zhamu et al. |
| 2013/0040197 A1 | 2/2013 | Liu et al. |
| 2013/0059174 A1 | 3/2013 | Zhamu |
| 2013/0171338 A1 | 7/2013 | Pan et al. |
| 2013/0224632 A1 | 8/2013 | Roumi |
| 2014/0045065 A1* | 2/2014 | Bao .............. H01M 4/386 429/217 |
| 2014/0154572 A1 | 6/2014 | Singh et al. |
| 2014/0242458 A1 | 8/2014 | Abe et al. |
| 2014/0255794 A1 | 9/2014 | Zhang et al. |
| 2015/0221935 A1 | 8/2015 | Zhou et al. |
| 2015/0311497 A1 | 10/2015 | Nettesheim et al. |
| 2016/0177109 A1* | 6/2016 | Hendricks ........... A61N 1/04 252/514 |
| 2016/0294000 A1 | 10/2016 | He et al. |
| 2016/0351909 A1 | 12/2016 | Bittner et al. |
| 2017/0179468 A1 | 6/2017 | Fanous et al. |
| 2017/0194648 A1 | 7/2017 | Bucur et al. |
| 2017/0288211 A1* | 10/2017 | Zhamu .............. H01M 4/483 |
| 2017/0338471 A1 | 11/2017 | Zheng et al. |
| 2017/0338472 A1* | 11/2017 | Zhamu .............. H01M 4/366 |
| 2018/0051137 A1 | 2/2018 | Kim et al. |
| 2018/0166759 A1 | 6/2018 | Zhamu et al. |
| 2018/0183098 A1 | 6/2018 | Yamamoto et al. |
| 2018/0301707 A1 | 10/2018 | Pan et al. |
| 2018/0351201 A1 | 12/2018 | Zhamu et al. |
| 2019/0334166 A1 | 10/2019 | Ishii |
| 2020/0006767 A1 | 1/2020 | Du et al. |
| 2020/0358081 A1 | 11/2020 | Lin et al. |
| 2022/0102758 A1 | 3/2022 | Locke et al. |

OTHER PUBLICATIONS

T. P. Kaloni, P. K. Giesbrecht, G. Schreckenbach, M. S. Freund. Polythiophene: From Fundamental Perspectives to Applications, Chem. Mater. 2017, 29, 10248-10283.*

Gurunathan et al., "Synthesis of Hierarchically Porous SnO2 Microspheres and Performance Evaluation as Li-Ion Battery Anode by Using Different Binders" ACS Appl. Mater. Inter. (2014) vol. 6, No. 19, pp. 16556-16564.

U.S. Appl. No. 16/380,341 Nonfinal Office Action dated Apr. 2, 2021, 10 pages.

U.S. Appl. No. 16/404,109 Nonfinal Office Action dated Feb. 18, 2021, 7 pages.

U.S. Appl. No. 16/404,111 Nonfinal Office Action dated Dec. 9, 2020, 6 pages.

U.S. Appl. No. 16/407,731 Nonfinal Office Action dated Apr. 19, 2021, 21 pages.

U.S. Appl. No. 16/407,731; Final Office Action dated Nov. 16, 2021; 39 pages.

U.S. Appl. No. 16/411,645; Non-Final Office Action dated Jan. 3, 2022; 85 pages.

U.S. Appl. No. 16/390,592; Non-Final Office Action dated Oct. 6, 2022; 39 pages.

U.S. Appl. No. 16/404,111; Final Office Action dated Aug. 26, 2022; 28 pages.

U.S. Appl. No. 16/411,645; Final Office Action dated Jan. 19, 2022; 149 pages.

U.S. Appl. No. 16/411,645; Non-Final Office Action dated Sep. 16, 2022; 36 pages.

* cited by examiner

METHOD OF PRODUCING CONDUCTING POLYMER NETWORK-ENABLED PARTICULATES OF ANODE ACTIVE MATERIAL PARTICLES FOR LITHIUM-ION BATTERIES

FIELD

The present disclosure relates generally to the field of lithium-ion batteries and, in particular, to graphene-protected, conducting polymer-embraced anode active material particles for lithium-ion batteries.

BACKGROUND

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidene fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the purpose of the charge transfer between an anode and a cathode. As the SEI is formed, the lithium ions become part of the inert SEI layer and become irreversible, i.e. these positive ions can no longer be shuttled back and forth between the anode and the cathode during subsequent charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies 0<a≤5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:
(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.
(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.
(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conductive to lithium ions (e.g., ceramic or oxide coating). Ideally, the protective material should meet the following requirements: (a) The protective material must be lithium ion-conducting as well as initially electron-conducting (when the anode electrode is made) and be capable of preventing liquid electrolyte from being in constant contact with the anode active material particles (e.g. Si). (b) The protective material should also have high fracture toughness or high resistance to crack formation to avoid disintegration during cycling. (c) The protective material must be inert (inactive) with respect to the electrolyte, but be a good lithium ion conductor. (d) The protective material must not provide any significant amount of defect sites that irreversibly trap lithium ions. (e) The combined protective material-anode material structure must allow for an adequate amount of free space to accommodate volume expansion of the anode active material particles when lithiated. The prior art protective materials all fall short of these requirements. Hence, it is not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is a specific object of the present disclosure to meet these needs and address the issues associated the rapid capacity decay of a lithium battery containing a high-capacity anode active material.

SUMMARY

The disclosure provides an anode particulate or multiple anode particulates (herein referred to as multi-functional particulates) for a lithium battery and a process or method for producing such particulates. The particulate or at least one of the multiple particulates comprises a core and a thin encapsulating layer (0.34 nm-20 μm in thickness, preferably 0.5 nm-10 μm) encapsulating or embracing the core. In some embodiments, the core comprises conducting polymer gel network-encapsulated anode active material primary particles, wherein one or a plurality of primary particles of an anode active material, having a diameter or thickness from 0.5 nm to 20 μm, is encapsulated by or embedded in an electrically and/or ionically conducting polymer gel network (which is preferably both electrically and ionically conducting). The encapsulating shell comprises multiple graphene sheets, which may be bonded together or sealed off with a conducting polymer. This bonding or sealing conducting polymer may be the same or different from the conducting polymer network. The conducting polymer gel network may be in a hydrated or dehydrated state, or in a solvent-swell state or relatively solvent-free state. The multi-functional particulate may have a diameter from 100 nm to 100 μm, preferably and typically from 500 nm to 50 μm, and more preferably and typically from 1 μm to 30 μm.

In certain embodiments, the multi-functional particulate comprises one or a plurality of primary particles of an anode active material (along with some graphene sheets) that are embedded in or encapsulated by a conducting polymer gel network. The exterior (outside) surfaces of the particulate may comprise graphene sheets, which preferably fully encapsulate the core or interior comprising the conducting polymer gel network-encapsulated graphene sheets and primary particles of the anode active material.

Preferably, the conducting polymer gel network contains a conjugated polymer selected from Polyacetylene, Polythiophene, Poly(3-alkylthiophenes), Polypyrrole, Polyaniline, Poly(isothianaphthene), Poly(3,4-ethylenedioxythiophene) (PEDOT), alkoxy-substituted Poly(p-phenylene vinylene), Poly(2,5-bis(cholestanoxy) phenylene vinylene), Poly(p-phenylene vinylene), Poly(2,5-dialkoxy) paraphenylene vinylene, Poly[(1,4-phenylene-1,2-diphenylvinylene)], Poly(3',7'-dimethyloctyloxy phenylene vinylene), Polyparaphenylene, Polyparaphenylene, Polyparaphenylene sulphide, Polyheptadiyne, Poly(3-hexylthiophene), Poly(3-octylthiophene), Poly(3-cyclohexylthiophene), Poly(3-methyl-4-cyclohexylthiophene), Poly(2,5-dialkoxy-1,4-phenyleneethynylene), Poly(2-decyloxy-1,4-phenylene), Poly (9,9-dioctylfluorene), Polyquinoline, a derivative thereof, a copolymer thereof, a sulfonated version thereof, or a combination thereof. In some preferred embodiments, the conducting polymer gel network comprises a polyaniline hydrogel, polypyrrole hydrogel, or polythiophene hydrogel in a dehydrated state.

Thus, in some embodiments, the disclosure provides multi-functional particulates for a lithium battery, at least one of said particulates comprising a core and a thin encapsulating layer that encapsulates or embraces the core, wherein the encapsulating shell comprises multiple graphene sheets and have a thickness from 0.5 nm to 10 μm and said core comprises conducting polymer gel network-encapsulated anode active material primary particles, wherein one or a plurality of primary particles of an anode active material, having a diameter or thickness from 0.5 nm to 20 μm, is encapsulated by or embedded in an electrically and/or ionically conducting polymer gel network. The graphene sheets may be selected from pristine graphene, graphene fluoride, graphene chloride, graphene bromide, graphene iodide, nitrogenated graphene, hydrogenated graphene, doped graphene, chemically functionalized graphene, a combination thereof, or a combination thereof with graphene oxide or reduced graphene oxide.

The graphene sheets in the encapsulating layer may be chemically bonded with a carbon material or a conducting polymer.

In certain alternative embodiments, the disclosure provides multi-functional particulates for a lithium battery, at least one of the particulates comprising one or a plurality of primary particles of an anode active material and graphene sheets that are embedded in or encapsulated by a conducting polymer gel network, wherein an exterior surface of the particulate comprises one or a plurality of graphene sheets. The graphene sheets are selected from pristine graphene, graphene fluoride, graphene chloride, graphene bromide, graphene iodide, nitrogenated graphene, hydrogenated graphene, doped graphene, chemically functionalized graphene, or a combination thereof and wherein said graphene sheets do not include CVD graphene, graphene oxide (GO), and reduced graphene oxide (RGO).

In some embodiments, the conducting polymer gel network is reinforced with a high-strength material selected from carbon nanotubes, carbon nano-fibers, carbon or graphite fibers, graphene sheets, expanded graphite flakes, polymer fibrils, glass fibers, ceramic fibers, metal filaments or metal nano-wires, whiskers, or a combination thereof.

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof. The Li alloy may contain from 0.1% to 10% by weight of a metal element selected from Zn, Ag, Au, Mg, Ni, Ti, Fe, Co, V, Al, or a combination thereof.

The anode active material may contain a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein $1 \leq x \geq 2$.

The primary particles of anode active material may be in a form of nanoparticle, nanowire, nanofiber, nanotube, nanosheet, nanobelt, nanoribbon, nanodisc, nanoplatelet, or nanohorn having a thickness or diameter from 0.5 nm to 100 nm. In some embodiments, at least one of the primary anode active material particles is coated with a layer of carbon, graphite, or graphene.

In certain embodiments, the particulate further comprises from 0.1% to 40% by weight of a lithium ion-conducting additive dispersed in the conducting polymer gel network. The lithium ion-conducting additive may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0 \leq x \leq 1$, $1 \leq y \geq 4$. Alternatively, the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium (LiN $(CF_3SO_2)_2$), lithium bis(oxalato)borate (LiBOB), lithium oxalyldifluoroborate ($LiBF_2C_2O_4$), lithium nitrate ($LiNO_3$), Li-Fluoroalkyl-Phosphate ($LiPF_3(CF_2CF_3)_3$), lithium bisperfluoro-ethylsulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, or a combination thereof.

The disclosure also provides a powder mass comprising presently invented multi-functional particulates and a battery anode comprising this powder mass. Also provides is a battery containing the battery anode, which is a lithium-ion battery, lithium metal battery, lithium-sulfur battery, lithium-air battery, or lithium-selenium battery.

The present disclosure also provides a method of producing multi-functional particulates of graphene-protected conducting polymer gel network-encapsulated anode particles for a lithium battery. The method comprises (A) providing particulates of conducting polymer gel network-encapsulated anode active material particles, wherein one or a plurality of primary particles of an anode active material having a diameter or thickness from 0.5 nm to 20 μm, is encapsulated by a conducting polymer gel network (which is preferably both electrically and ionically conducting); and (B) embracing the particulates of conducting polymer gel network-encapsulated anode active material particles with a shell of multiple graphene sheets to produce the multi-functional particulates. For convenience, this is herein referred to as Approach 1.

The particulates of conducting polymer gel network-encapsulated anode active material particles provided in step (A) may be produced by operating a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, or a combination thereof.

In certain preferred embodiments, step (B) comprises conducting spray-drying, fluidized bed coating, or air-suspension coating to embrace or encapsulate the particulates of conducting polymer gel-encapsulated anode active material particles with multiple graphene sheets to produce the graphene-embraced anode particulates (the multi-functional particulates).

In certain embodiments of the disclosure, the method of producing multi-functional particulates of graphene-protected conducting polymer gel network-encapsulated anode particles for a lithium battery may comprise: (a) dispersing a plurality of primary particles of an anode active material, having a diameter or thickness from 0.5 nm to 20 µm, and multiple graphene sheets into a precursor liquid to a conducting polymer gel network to form a suspension; and (b) forming the suspension into micro-droplets and, concurrently or sequentially, polymerizing and/or crosslinking the precursor to form the multi-functional particulates. For convenience, this is herein referred to as Approach 2.

The step of forming the suspension into micro-droplets may include operating a procedure selected from pan-coating, air-suspension coating, centrifugal extrusion, vibration-nozzle encapsulation, spray-drying, coacervation-phase separation, interfacial polycondensation or interfacial crosslinking, in-situ polymerization, matrix polymerization, or a combination thereof.

In some embodiments, the precursor solution may contain a monomer, an initiator or catalyst, a crosslinking or gelating agent, an oxidizer and/or dopant. During or after the micro-droplet formation procedure, one may initiate the polymerization and crosslinking reactions to produce lightly crosslinked networks of conducting polymer chains inside the droplets and on the droplet surfaces. These networks of polymer chains, if impregnated with water or an organic liquid solvent, can become a gel. In the particulate, the primary particles of anode active material (e.g. Si nanowires or SiO particles) and some graphene sheets are embedded in or encapsulated by the conducting polymer network gel. Typically, the particulate also comprises multiple graphene sheets embracing a core comprising conducting polymer network gel-encapsulated anode particles and graphene sheets.

In some embodiments, step (B) in Approach 1 comprises:
i) mixing multiple particles of a graphitic material, the particulates of conducting polymer gel network-encapsulated anode active material particles, and optional milling balls or beads, to form a mixture in an impacting chamber of an energy impacting apparatus;
ii) operating the energy impacting apparatus with a frequency and an intensity for a length of time sufficient for peeling off graphene sheets from the particles of graphitic material and transferring the peeled graphene sheets to surfaces of the particulates of conducting polymer gel network-encapsulated anode active material particles to produce the multi-functional particulates; and
iii) recovering the multi-functional particulates from the impacting chamber and separating the milling balls from the multi-functional particulates.

In some embodiments, the particles of ball-milling media contain milling balls selected from ceramic particles, including $ZrO_2$ and non-$ZrO_2$ metal oxide particles, metal particles, glass particles, polymer particles, or a combination thereof.

The multiple graphene sheets in the encapsulating shell or those in the embedding matrix of conducting polymer gel network may comprise single-layer or few-layer graphene, wherein said few-layer graphene sheets have 2-10 layers of stacked graphene planes having an inter-plane spacing $d_{002}$ from 0.3354 nm to 0.6 nm as measured by X-ray diffraction and said single-layer or few-layer graphene sheets contain a pristine graphene material having essentially zero % of non-carbon elements, or a non-pristine graphene material having 0.001% to 25% by weight of non-carbon elements.

The non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

The energy impacting apparatus is preferably selected from a double cone mixer, double cone blender, vibratory ball mill, planetary ball mill, high energy mill, basket mill, agitator ball mill, cryogenic ball mill, micro ball mill, tumbler ball mill, attritor, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer. Preferably, the procedure of operating the energy impacting apparatus is conducted in a continuous manner using a continuous energy impacting device.

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), niobium (Nb), and cadmium (Cd); (b) alloys or intermetallic compounds of Si, Ge, Sn, Pb, Sb, Bi, Zn, Al, Ti, Ni, Co, Nb, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium niobium oxide, lithium-containing titanium oxide, lithium transition metal oxide; (f) prelithiated versions thereof; and (g) combinations thereof.

In certain embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein $1 \leq x \geq 2$.

In certain preferred embodiments, anode active material primary particles are porous having surface pores, internal pores, or both surface and internal pores.

The anode active material is preferably in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

In certain embodiments, at least one of the anode active material particles is coated with a layer of carbon or graphene prior to being decorated onto the surfaces of carbon or graphite particles.

The present disclosure also provides a powder mass containing the invented anode particulates. In some embodiments, the invented method further comprises a step of making the invented multiple anode particulates into a powder mass as a product. Also provided is a battery anode containing the invented particulate described above. The disclosure further provides a battery containing such a battery anode. Thus, the method may further contain a step of incorporating the anode particulates into an anode and a further step of combining the anode, a cathode and electrolyte into a battery cell. The battery may be a lithium-ion battery, lithium metal secondary battery, lithium-sulfur battery, lithium-air battery, or lithium-selenium battery.

The method is strikingly simple, fast, scalable, environmentally benign, and cost-effective. In some embodiments, the graphitic material or carbonaceous material has never been intercalated, oxidized, or exfoliated and does not include previously produced isolated graphene sheets.

The particles of ball-milling media may contain milling balls selected from ceramic particles, metal oxide particles, metal particles, glass particles, polymer particles, or a combination thereof. Metal particles that are ferromagnetic or are capable of being attracted to a magnetic field are particularly desired since they can be more readily or easily removed or separated from the graphene-embraced polymer-coated active materials that are normally non-magnetic.

There can be some particles of graphitic material that are not fully utilized (i.e., not all graphene sheets have been peeled off) after step b). Hence, in an embodiment, an amount of residual graphitic material remains after step b) and the method further comprises a step of partially or completely separating the residual amount of graphitic material from the graphene-embraced composite particles.

In some embodiments, the particles of anode active material contain pre-lithiated particles. In other words, before the electrode active material particles (such as Si or $SnO_2$) are combined with a sacrificial material and embraced by graphene sheets, these particles have been previously intercalated with Li ions (e.g. via electrochemical charging) up to an amount of 0.1% to 30% by weight of Li. Such a pre-lithiating step may be conducted after the porous anode particulates are made.

In some embodiments, the primary particles of anode active material contain particles pre-coated with a coating layer of a conductive material selected from carbon, pitch, carbonized resin, a conductive polymer, a conductive organic material, a metal coating, a metal oxide shell, graphene sheets, or a combination thereof. The coating layer thickness is preferably in the range from 1 nm to 20 μm, preferably from 5 nm to 10 μm, and further preferably from 10 nm to 1 μm.

The present disclosure also provides a powder mass of graphene-embraced anode particulates produced by the aforementioned method, wherein the graphene proportion is from 0.01% to 20% by weight based on the total particulate weight.

It may be noted that the graphene production step per se (peeling off graphene sheets directly from graphite particles and immediately or concurrently transferring these graphene sheets to composite particle surfaces) is quite surprising, considering the fact that prior researchers and manufacturers have focused on more complex, time intensive and costly methods to create graphene in industrial quantities. In other words, it has been generally believed that chemical intercalation and oxidation is needed to produce bulk quantities of isolated graphene sheets (NGPs). The present disclosure defies this expectation in many ways:

1. Unlike the chemical intercalation and oxidation (which requires expansion of inter-graphene spaces, further expansion or exfoliation of graphene planes, and full separation of exfoliated graphene sheets), instant method can directly remove graphene sheets from a source graphitic material and transfers these graphene sheets to surfaces of particulates of conducting polymer gel network-encapsulated anode active material particles. No undesirable chemicals (e.g. sulfuric acid and nitric acid) are used.
2. Unlike oxidation and intercalation, pristine graphene sheets can be transferred onto the composite particle surfaces. The sheets being free of oxidation damage allow the creation of graphene-encapsulated particle products with higher electrical and thermal conductivity.
3. Contrary to common production methods, a washing process requiring substantial amounts of water or solvent is not needed with the instant method.
4. Unlike bottom up production methods capable of producing small graphene sheets, large graphene sheets can be produced with the instant method.
5. Unlike CVD and solution-based metalorganic production methods, elevated temperatures are not required to reduce graphene oxide to graphene and to convert metalorganic compounds to pure metal. This greatly reduces the opportunity for undesirable diffusion of carbon into the electrode active material.
6. Unlike CVD and solution-based metalorganic production methods, this process is amenable to almost any electrode active material. The electrode active material does not need to be a compatible "template" or catalyst, as is required for the CVD process.
7. The present disclosure is amenable to industrial scale production in a continuous energy impact device.

DETAILED DESCRIPTION OF PREFERRED EMBODIMENTS

A lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 µm thick (more typically 100-200 µm) to give rise to a sufficient amount of current per unit electrode area.

Figure 2A:
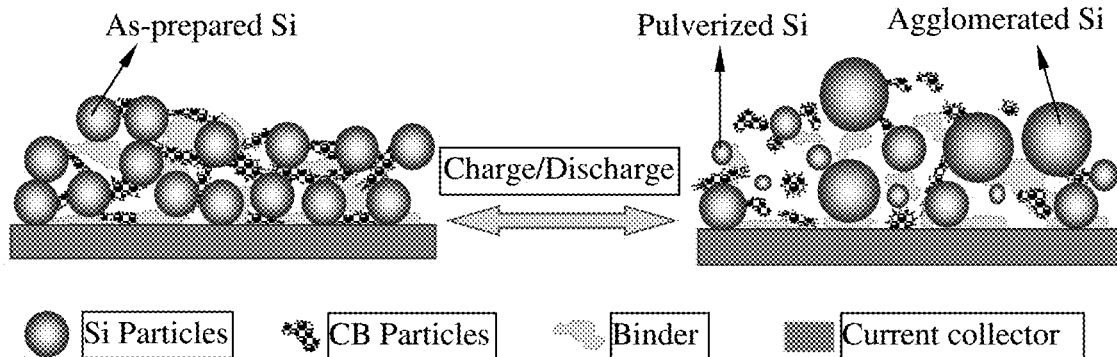
FIG. 2(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.

In order to obtain a higher energy density cell, the anode can be designed to contain higher-capacity anode active materials having a composition formula of $Li_aA$ (A is a metal or semiconductor element, such as Al and Si, and "a" satisfies $0<a\le 5$). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as discussed in the Background section, there are several problems associated with the implementation of these high-capacity anode active materials:

1) As schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/or brittleness of the protective coating materials. There has been no high-strength and high-toughness material available that is itself also lithium ion conductive.

3) The approach of using a core-shell structure (e.g. Si nanoparticle encapsulated in a carbon or $SiO_2$ shell) also has not solved the capacity decay issue. As illustrated in upper portion of FIG. 2(B), a non-lithiated Si particle can be encapsulated by a carbon shell to form a core-shell structure (Si core and carbon or $SiO_2$ shell in this example). As the lithium-ion battery is charged, the anode active material (carbon- or $SiO_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery. These reactions continue to consume the electrolyte and reduce the cell's ability to store lithium ions.

Figure 2B:
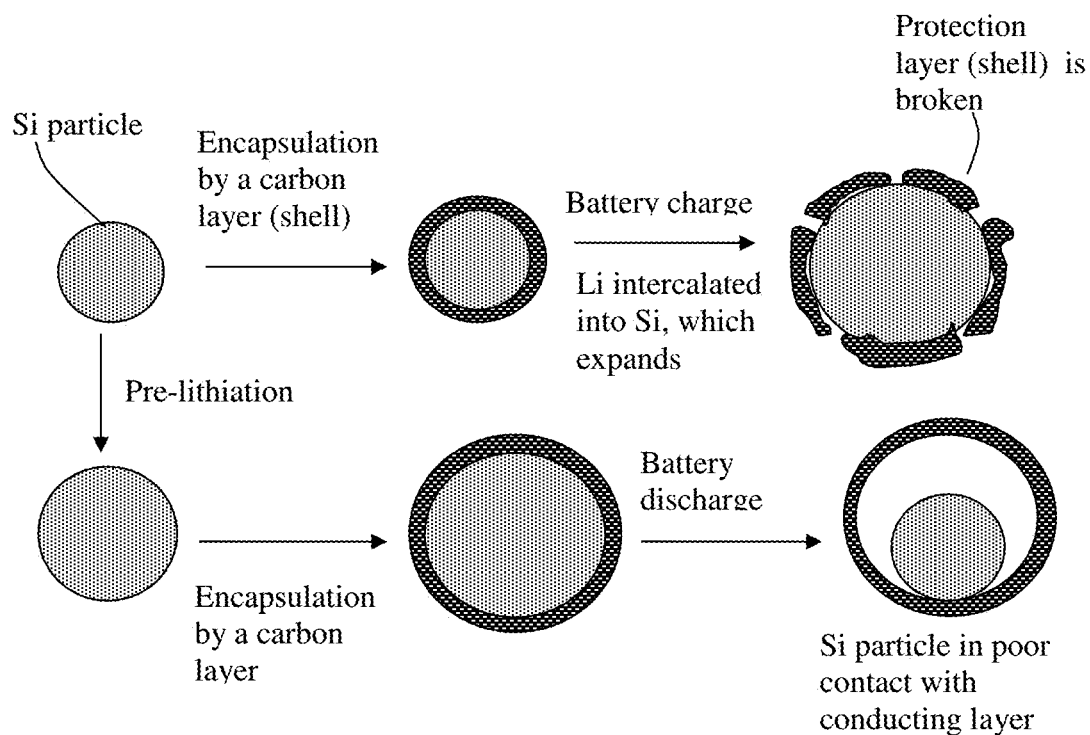
FIG. 2(B) illustrates the issues associated with prior art anode active material; for instance, a non-lithiated Si particle encapsulated by a protective shell (e.g. carbon shell) in a core-shell structure inevitably leads to breakage of the shell and that a pre-lithiated Si particle encapsulated with a protective layer leads to poor contact between the contracted Si particle and the rigid protective shell during battery discharge.

4) Referring to the lower portion of FIG. 2(B), wherein the Si particle has been pre-lithiated with lithium ions; i.e. has been pre-expanded in volume. When a layer of carbon (as an example of a protective material) is encapsulated around the pre-lithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these conflicting problems. We have solved these challenging issues that have troubled battery designers and electrochemists alike for more than 30 years by developing the multi-functional particulates of graphene-protected, conducting polymer gel network-encapsulated anode active material particles (e.g. Si and $SiO_x$ particles, $0<x<2.0$).

The disclosure provides multi-functional particulates for a lithium battery, at least one of the particulates comprising a core and a thin encapsulating layer that encapsulates or embraces the core, wherein the encapsulating shell comprises multiple graphene sheets and have a thickness from 0.5 nm to 10 µm and the core comprises conducting polymer gel network-encapsulated anode active material primary particles, wherein one or a plurality of primary particles of an anode active material (having a diameter or thickness from 0.5 nm to 20 µm) is encapsulated by or embedded in an electrically and/or ionically conducting polymer gel network.

The graphene sheets may be selected from pristine graphene, graphene fluoride, graphene chloride, graphene bromide, graphene iodide, nitrogenated graphene, hydrogenated graphene, doped graphene, chemically functionalized graphene, a combination thereof, or a combination thereof with graphene oxide or reduced graphene oxide. The graphene sheets in the encapsulating layer may be chemically bonded with a carbon material or a conducting polymer.

In certain alternative embodiments, the disclosure provides multi-functional particulates for a lithium battery, at least one of the particulates comprising one or a plurality of primary particles of an anode active material and graphene sheets that are embedded in or encapsulated by a conducting polymer gel network, wherein an exterior surface of the particulate comprises one or a plurality of graphene sheets. The graphene sheets are selected from pristine graphene, graphene fluoride, graphene chloride, graphene bromide, graphene iodide, nitrogenated graphene, hydrogenated graphene, doped graphene, chemically functionalized graphene, or a combination thereof and wherein said graphene sheets do not include CVD graphene, graphene oxide (GO), and reduced graphene oxide (RGO).

Preferably, the conducting polymer gel network contains a conjugated polymer selected from Polyacetylene, Polythiophene, Poly(3-alkylthiophenes), Polypyrrole, Polyaniline, Poly(isothianaphthene), Poly(3,4-ethylenedioxythiophene) (PEDOT), alkoxy-substituted Poly(p-phenylene vinylene), Poly(2,5-bis(cholestanoxy) phenylene vinylene), Poly(p-phenylene vinylene), Poly(2,5-dialkoxy) paraphenylene vinylene, Poly[(1,4-phenylene-1,2-diphenylvinylene)], Poly(3',7'-dimethyloctyloxy phenylene vinylene), Polyparaphenylene, Polyparaphenylene, Polyparaphenylene sulphide, Polyheptadiyne, Poly(3-hexylthiophene), Poly(3-octylthiophene), Poly(3-cyclohexylthiophene), Poly(3-methyl-4-cyclohexylthiophene), Poly(2,5-dialkoxy-1,4-phenyleneethynylene), Poly(2-decyloxy-1,4-phenylene), Poly (9,9-dioctylfluorene), Polyquinoline, a derivative thereof, a copolymer thereof, a sulfonated version thereof, or a combination thereof. In some preferred embodiments, the conducting polymer gel network comprises a polyaniline hydrogel, polypyrrole hydrogel, or polythiophene hydrogel in a dehydrated state.

The anode active material may be in a form of minute solid or porous particles (primary anode material particles) having a diameter or thickness from 0.5 nm to 2 μm (preferably from 1 nm to 100 nm). One or a plurality of primary particles are embedded in or encapsulated by a conducting polymer gel network to form a micro-droplet. This micro-droplet is encapsulated or embraced by a shell of multiple graphene sheets.

In some embodiments, the graphene sheets partially or fully cover or encapsulate the micro-droplet. In some embodiments, the conducting polymer serves as an adhesive that chemically bonds multiple graphene sheets together to form the encapsulating shell.

The encapsulating shell may contain just the graphene sheets alone without using a binder or matrix. Alternatively, the graphene sheets may be bonded by a binder (e.g. a conductive resin or carbon binder) or dispersed in a resin or carbon matrix. Preferably, the encapsulating shell has a thickness from 1 nm to 10 μm (preferably less than 1 μm and most preferably <100 nm), and a lithium ion conductivity from $10^{-8}$ S/cm to $10^{-2}$ S/cm (more typically from $10^{-5}$ S/cm to $10^{-3}$ S/cm). The encapsulating shell preferably has an electrical conductivity from $10^{-7}$ S/cm to 3,000 S/cm, up to 20,000 S/cm (more typically from $10^{-4}$ S/cm to 1000 S/cm) when measured at room temperature on a separate cast thin film 20 μm thick.

Preferably, the anode active material is a high-capacity anode active material having a specific lithium storage capacity greater than 372 mAh/g, which is the theoretical capacity of graphite.

The primary particles themselves may be porous having porosity in the form of surface pores and/or internal pores. FIG. 3(B) shows some examples of porous primary particles of an anode active material. These pores of the primary particles allow the particle to expand into the free space without a significant overall volume increase of the particulate and without inducing any significant volume expansion of the entire anode electrode.

This amount of pore volume inside the particulate (surface or internal pores of porous primary anode particles) provides empty space to accommodate the volume expansion of the anode active material so that the thin encapsulating layer would not significantly expand (not to exceed 50% volume expansion of the particulate) when the lithium battery is charged. Preferably, the particulate does not increase its volume by more than 20%, further preferably less than 10% and most preferably by approximately 0% when the lithium battery is charged. Such a constrained volume expansion of the particulate would not only reduce or eliminate the volume expansion of the anode electrode but also reduce or eliminate the issue of repeated formation and destruction of a solid-electrolyte interface (SEI) phase. We have discovered that this strategy surprisingly results in significantly reduced battery capacity decay rate and dramatically increased charge/discharge cycle numbers. These results are unexpected and highly significant with great utility value.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In other words, graphene planes (hexagonal lattice structure of carbon atoms) constitute a significant portion of a graphite particle.

One preferred specific embodiment of the present disclosure is a method of peeling off graphene planes of carbon atoms (1-10 planes of atoms that constitute single-layer or few-layer graphene sheets) that are directly transferred to surfaces of composite micro-droplet particles comprising anode active material particles encapsulated by or embedded in a conducting polymer gel network. A graphene sheet or nanographene platelet (NGP) is essentially composed of a sheet of graphene plane or multiple sheets of graphene plane stacked and bonded together (typically, on an average, less than 10 sheets per multi-layer platelet). Each graphene plane, also referred to as a graphene sheet or a hexagonal basal plane, comprises a two-dimensional hexagonal structure of carbon atoms. Each platelet has a length and a width parallel to the graphite plane and a thickness orthogonal to the graphite plane. By definition, the thickness of an NGP is 100 nanometers (nm) or smaller, with a single-sheet NGP being as thin as 0.34 nm. However, the NGPs produced with the instant methods are mostly single-layer graphene and some few-layer graphene sheets (<10 layers). The length and width of a NGP are typically between 200 nm and 20 μm, but could be longer or shorter, depending upon the sizes of source graphite material particles.

The present disclosure provides a strikingly simple, fast, scalable, environmentally benign, and cost-effective process that avoids essentially all of the drawbacks associated with prior art processes of producing graphene sheets and obviates the need to execute a separate (additional) process to combine the produced graphene sheets and conducting polymer network-encapsulated anode active material particles.

Figure 3A:
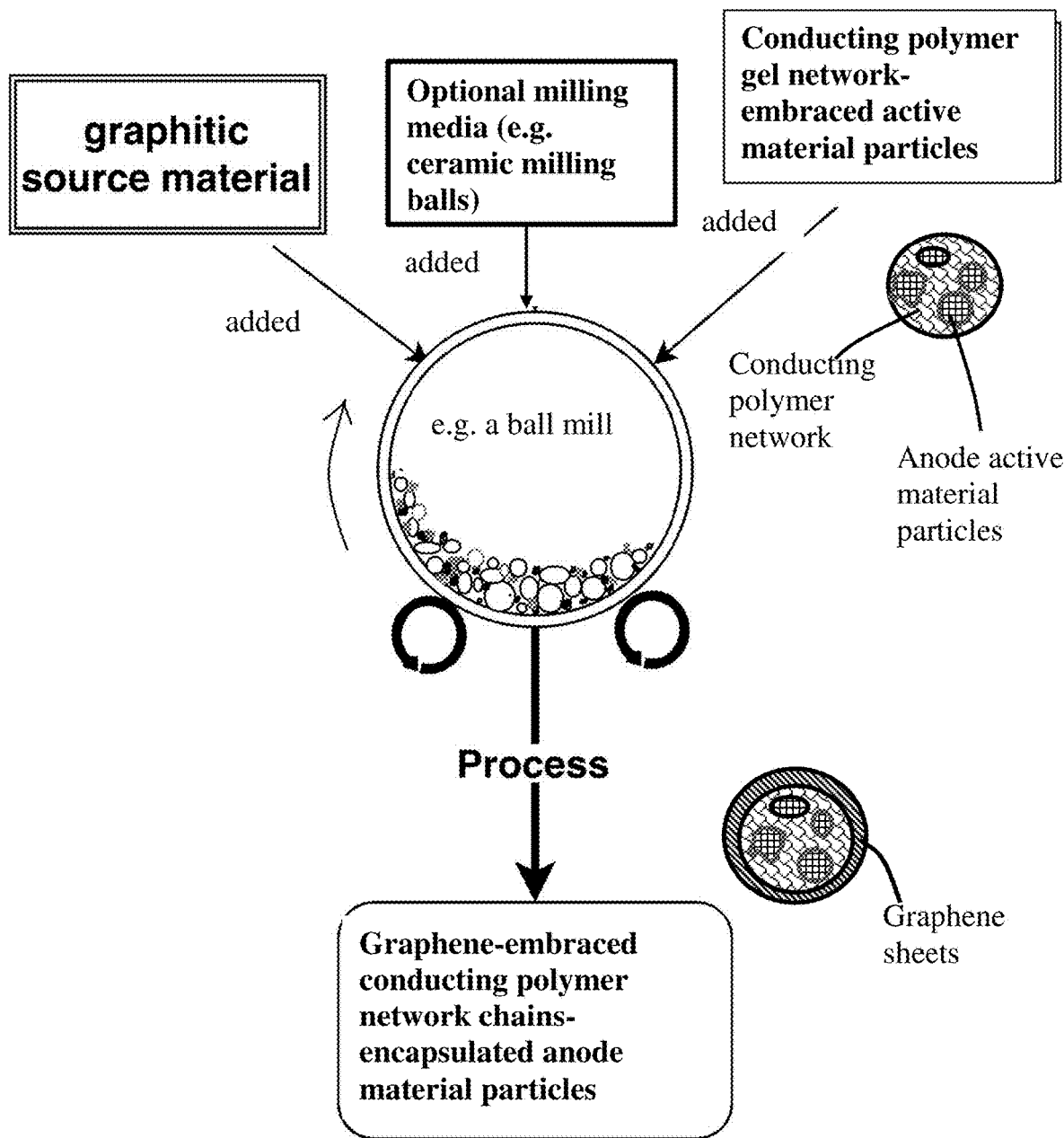
FIG. 3(A) A diagram showing some embodiments of the presently invented process for producing multi-functional anode particulates via an energy impacting apparatus.
Figure 3B:
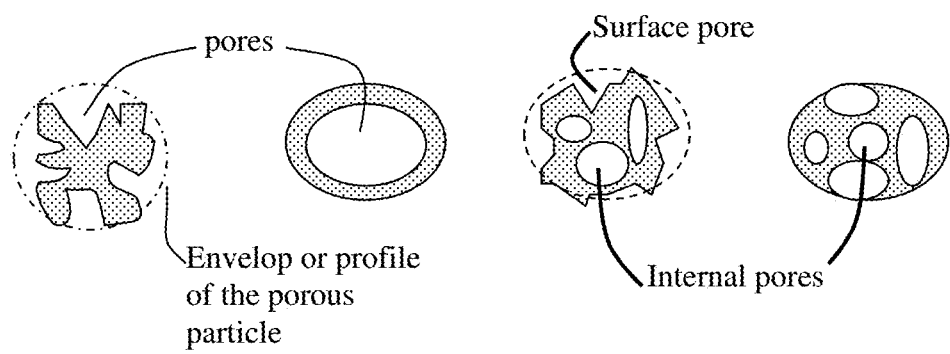
FIG. 3(B) Some examples of porous primary particles of an anode active material.

As schematically illustrated in FIG. 3(A), one embodiment of this method entails placing particles of a source graphitic material, multiple micro-droplets of conducting polymer network-encapsulated anode active material particles, and optional impacting balls (particles of ball-milling media) in an impacting chamber. After loading, the resulting mixture is exposed to impacting energy, which is accomplished, for instance, by rotating the chamber to enable the impacting of the milling balls against graphite particles. These repeated impacting events (occurring in high frequencies and high intensity) act to peel off graphene sheets from the surfaces of graphitic material particles and tentatively transferred to the surfaces of these impacting balls first. When the graphene-coated impacting balls subsequently impinge upon the micro-droplets of conducting polymer network-encapsulated anode active material particles, the graphene sheets are transferred to surfaces of the micro-droplets particles to form graphene-encapsulated micro-droplets of conducting polymer network-encapsulated anode active material particles. Typically, the micro-droplet of conducting polymer network-encapsulated anode active material particles is covered by graphene sheets (fully wrapped around, embraced or encapsulated). Subsequently, the externally added impacting balls (e.g. ball-milling media) are separated from the multi-functional particulates.

In this version of the invented method, externally added milling balls are used and the peeled-off graphene sheets can be transferred to the milling ball surfaces first and then subsequently transferred to surfaces of the anode material-decorated carbon/graphite particles. As such, this process is herein referred to as the "indirect transfer process."

The particles of ball-milling media may contain milling balls selected from ceramic particles (e.g. $ZrO_2$ or non-$ZrO_2$-based metal oxide particles), metal particles, polymer beads, glass particles, or a combination thereof.

Both the indirect transfer and direct transfer processes are a part of the presently invented method (Approach 1) of producing multi-functional anode particulates.

One preferred embodiment of this method entails placing source graphitic material particles, an optional oxidizing agent and/or chemical functionalization agent (if so desired), and multiple micro-droplets of conducting polymer network-encapsulated anode active material particles (but without externally added impacting balls) in an impacting chamber. After loading, the resulting mixture is immediately exposed to impacting energy, which is accomplished by rotating the chamber to enable the impacting of the micro-droplets of conducting polymer network-encapsulated anode active material particles (no externally added impacting balls being present inside the chamber) against graphite particles (the graphene source). These repeated impacting events (occurring in high frequencies and high intensity) act to peel off graphene sheets from the surfaces of graphitic material particles and directly transfer these graphene sheets to the surfaces of micro-droplets of conducting polymer network-encapsulated anode active material particles to produce the multi-functional particulates (i.e. graphene-encapsulated micro-droplets of conducting polymer network-encapsulated anode active material particles). This is the "direct transfer process."

In less than two hours (often less than 1 hour) of operating the direct transfer process, most of the constituent graphene sheets of source graphite particles are peeled off, forming mostly single-layer graphene and few-layer graphene (mostly less than 5 layers or 5 graphene planes). Following the transfer process (graphene sheets wrapped around micro-droplets of conducting polymer network-encapsulated anode active material particles), the residual graphite particles (if present) are separated from the multi-functional particulates using a broad array of methods. Separation or classification of multi-functional particulates from residual graphite particles (if any) can be readily accomplished based on their differences in weight or density, particle sizes, magnetic properties, etc. The resulting graphene-embraced micro-droplets of conducting polymer network-encapsulated anode active material particles are already a two-component material; i.e. they are already "mixed" and there is no need to have a separate process of mixing isolated graphene sheets with anode material-decorated carbon/graphite particles.

In other words, production of graphene sheets and mixing of graphene sheets with micro-droplets of conducting polymer network-encapsulated anode active material particles are essentially accomplished concurrently in one operation. These graphene sheets substantially encapsulate or embrace the micro-droplets. This is in stark contrast to the traditional processes that typically include producing graphene sheets first and then subsequently mixing the graphene sheets with an active material. Traditional dry mixing typically does not result in homogeneous mixing or dispersion of two or multiple components. It is also challenging to properly disperse nanomaterials in a solvent to form a battery slurry mass for coating on a current collector.

In certain embodiments, the multiple micro-droplets of conducting polymer network-encapsulated anode active material particles are produced by operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, extrusion and pelletizing, or a combination thereof.

Figure 1:
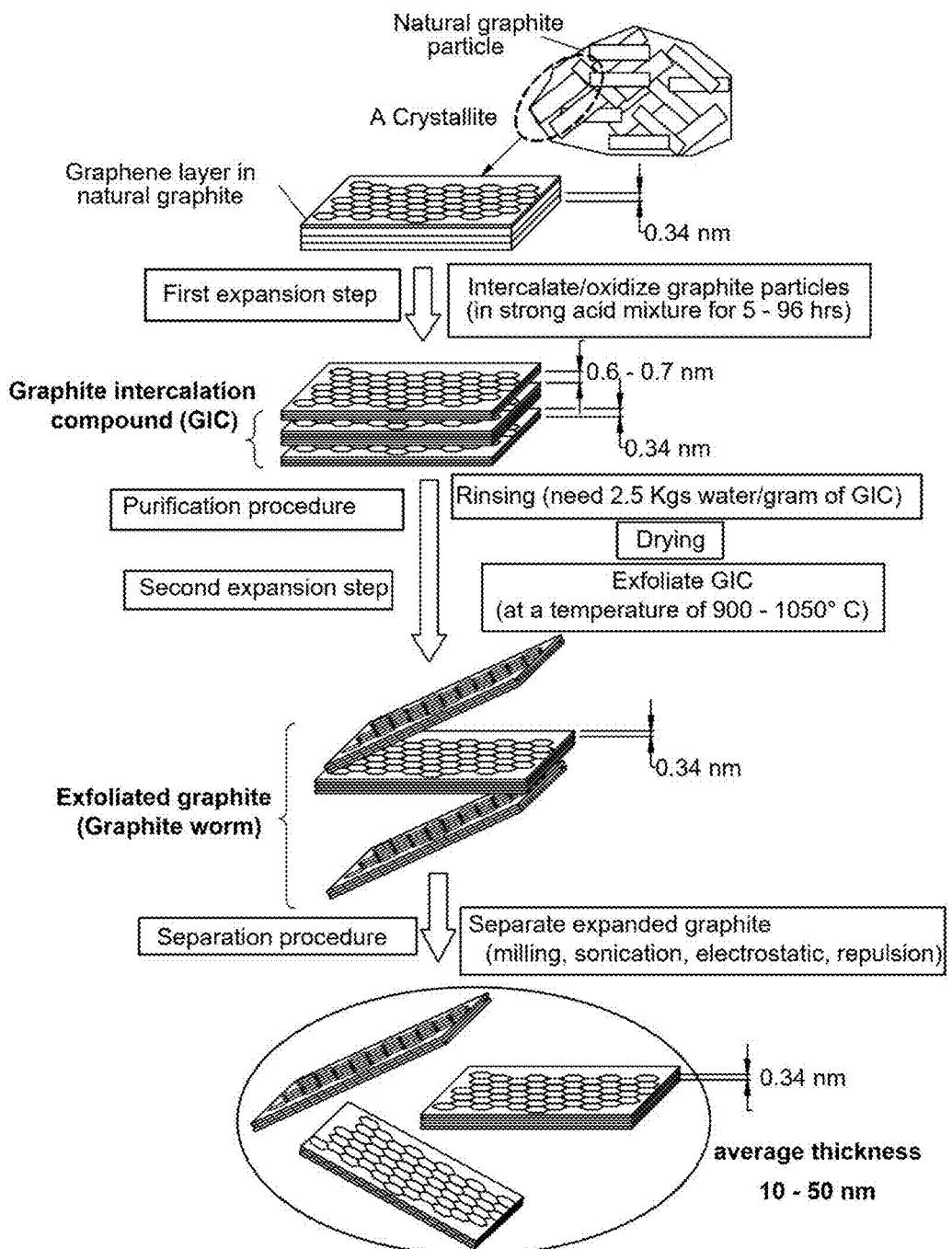
FIG. 1 A flow chart showing the most commonly used prior art process of producing highly oxidized graphene sheets (or nanographene platelets, NGPs) that entails tedious chemical oxidation/intercalation, rinsing, and high-temperature exfoliation procedures.

As shown in FIG. 1, the prior art chemical processes for producing graphene sheets or platelets alone typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water. The dried powder, referred to as graphite intercalation compound (GIC) or graphite oxide (GO), is then subjected to a thermal shock treatment. This can be accomplished by placing GIC in a furnace pre-set at a temperature of typically 800-1100° C. (more typically 950-1050° C.). The resulting products are typically highly oxidized graphene (i.e. graphene oxide with a high oxygen content), which must be chemically or thermal reduced to obtain reduced graphene oxide (RGO). RGO is found to contain a high defect population and, hence, is not as conducting as pristine graphene. We have observed that that the pristine graphene paper (prepared by vacuum-assisted filtration of pristine graphene sheets, as herein prepared) exhibit electrical conductivity values in the range from 1,500-4,500 S/cm. In contrast, the RGO paper prepared by the same paper-making procedure typically exhibits electrical conductivity values in the range from 100-1,000 S/cm.

In the most common implementation of prior art ball mill mixing, previously produced graphene sheets or platelets are added to electrode active material powders. Impact energy is applied via ball mill for a period of time to disperse graphene platelets or sheets in the powder. This is often carried out in a liquid (solvent) solution. The disadvantages of this graphene/active material mixing process are obvious—previously made graphene is a costly input material, solvent recovery is required, and most significantly, the graphene input into the process has been damaged by oxidation during prior processing. This reduces desirable end properties, such as thermal conductivity and electrical conductivity.

Another prior art process is coating of CVD graphene onto metal nanoparticles. This is the most limited of all prior art methods, being possible only on certain metals that are suitable catalysts for facilitating decomposition of hydrocarbon gas to form carbon atoms and as templates for graphene to grow on. As a "bottom up" graphene production method, it requires costly capital equipment and costly input materials.

In an alternative process (Approach 2) for producing graphene-coated, conducting polymer gel network-embraced electrode active material particles, both pre-made isolated graphene sheets and particles of the active material are dispersed in a reactive precursor solution (e.g. a monomer, an initiator, and a curing or cross-linking agent) to form a suspension. The suspension is then dried (e.g. using spray drying) to form reactive micro-droplets comprising the reactive precursor, which is polymerized/cured, concurrently or subsequently, to obtain multi-functional anode particulates. In these multi-functional anode particulates, graphene sheets are present inside the micro-droplets (i.e. internal graphene sheets embedded in or encapsulated by the conducting polymer gel network) and on the exterior surfaces of the micro-droplets (herein referred to as exterior graphene sheets).

The presently invented impact transfer process (part of Approach 1) entails combining graphene production, functionalization (if desired), and mixing of graphene with micro-droplets of conducting polymer network-encapsulated anode active material particles in a single operation. This fast and environmentally benign process not only avoids significant chemical usage, but also produces embracing graphene sheets of higher quality—pristine graphene as opposed to thermally reduced graphene oxide produced by the prior art process. Pristine graphene enables the creation of embraced particles with higher electrical and thermal conductivity.

Although the mechanisms remain incompletely understood, this revolutionary process of the present disclosure has essentially eliminated the conventionally required functions of graphene plane expansion, intercalant penetration, exfoliation, and separation of graphene sheets and replace it with a single, entirely mechanical peeling process. The whole process can take less than 2 hours (typically 10 minutes to 1 hour), and can be done with no added chemicals. This is absolutely stunning, a shocking surprise to even those top scientists and engineers or those of extraordinary ability in the art.

Another surprising result of the present study is the observation that a wide variety of carbonaceous and graphitic materials (as a graphene source) can be directly processed without any particle size reduction or pre-treatment. The particle size of graphite can be smaller than, comparable to, or larger than the particle size of the anode material-decorated carbon/graphite particles. The graphitic material, as the graphene source, may be selected from natural graphite, synthetic graphite, highly oriented pyrolytic graphite, meso-carbon micro-bead, graphite fiber, graphitic nano-fiber, graphite oxide, graphite fluoride, chemically modified graphite, exfoliated graphite, or a combination thereof. It may be noted that the graphitic material used for the prior art chemical production and reduction of graphene oxide requires size reduction to 75 um or less in average particle size. This process requires size reduction equipment (for example hammer mills or screening mills), energy input, and dust mitigation. By contrast, the energy impacting device method can accept almost any size of graphitic material. A starting graphitic material of several mm or cm in size or larger or a starting material as small as nano-scaled has been successfully processed to create graphene-coated or graphene-embedded particles of cathode or anode active materials. The only size limitation is the chamber capacity of the energy impacting device; but this chamber can be very large (industry-scaled).

The presently invented process is capable of producing single-layer graphene sheets that completely wrap around the micro-droplets of conducting polymer network-encapsulated anode active material particles. In many examples, the graphene sheets produced contain at least 80% single-layer graphene sheets. The graphene produced can contain pristine graphene, oxidized graphene with less than 5% oxygen content by weight, graphene fluoride, graphene oxide with less than 5% fluorine by weight, graphene with a carbon content of no less than 95% by weight, or functionalized graphene.

The presently invented process does not involve the production of GIC and, hence, does not require the exfoliation of GIC at a high exfoliation temperature (e.g. 800-1, 100° C.). This is another major advantage from environmental protection perspective. The prior art processes require the preparation of dried GICs containing sulfuric acid and nitric acid intentionally implemented in the inter-graphene spaces and, hence, necessarily involve the decomposition of $H_2SO_4$ and $HNO_3$ to produce volatile gases (e.g. $NO_x$ and $SO_x$) that are highly regulated environmental hazards. The presently invented process completely obviates the need to decompose $H_2SO_4$ and $HNO_3$ and, hence, is environmentally benign. No undesirable gases are released into the atmosphere during the combined graphite expansion/exfoliation/separation process of the present disclosure.

It may be noted that, although not preferred, the graphene source used in the invented impact transfer procedure may contain previously made graphene sheets (pristine graphene, GO, RGO, halogenated graphene, nitrogenated graphene, hydrogenated graphene, functionalized graphene, or a combination thereof.

Figure 4:
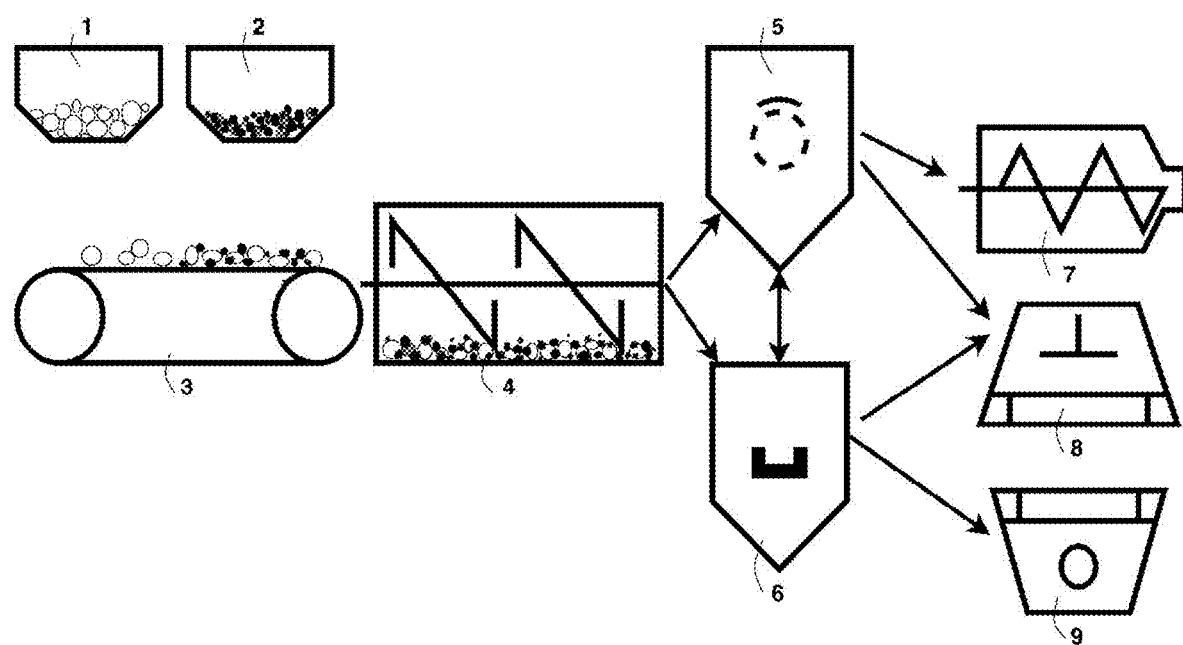
FIG. 4 A diagram showing the presently invented continuous process for producing graphene-embraced particulates.

In a desired embodiment, the presently invented method is carried out in an automated and/or continuous manner. For instance, as illustrated in FIG. 4, the mixture of graphite particles 1 and micro-droplets of conducting polymer network-encapsulated anode active material particles 2 (along with optional milling balls) is delivered by a conveyer belt 3 and fed into a continuous ball mill 4. After ball milling to form multi-functional particulates, the product mixture (possibly also containing some residual graphite particles) is discharged from the ball mill apparatus 4 into a screening device (e.g. a rotary drum 5) to separate multi-functional particulates from residual graphite particles (if any). The multi-functional particulates may be delivered into a powder classifier, a cyclone, and or an electrostatic separator. The particles may be further processed, if so desired, by melting 7, pressing 8, or grinding/pelletizing apparatus 9. These procedures can be fully automated. The process may include characterization or classification of the output material and recycling of insufficiently processed material into the continuous energy impacting device. The process may include weight monitoring of the load in the continuous energy impacting device to optimize material properties and throughput.

The separation of the milling balls, if any, from the final products may be assisted by a magnetic separator 6 if the milling balls are ferromagnetic (e.g. containing Fe, Co, Ni, or Mn-based metal in some desired electronic configuration).

The micro-droplets of conducting polymer network-encapsulated anode active material particles that are placed into the impacting chamber can contain those anode active materials capable of storing lithium ions greater than 372 mAh/g, theoretical capacity of natural graphite. Examples of these high-capacity anode active materials are Si, Ge, Sn, $SnO_2$, $SiO_x$, $Co_3O_4$, etc. As discussed earlier, these materials, if implemented in the anode, have the tendency to expand and contract when the battery is charged and discharged. At the electrode level, the expansion and contraction of the anode active material can lead to expansion and contraction of the anode, causing mechanical instability of the battery cell. At the anode active material level, repeated expansion/contraction of particles of Si, Ge, Sn, $SiO_x$, $SnO_2$, $Co_3O_4$, etc. quickly leads to pulverization of these particles and rapid capacity decay of the electrode.

The primary anode active material particles are preferably porous, having surface pores or internal pores, as schematically illustrated in FIG. 3(B). The production methods of porous solid particles are well-known in the art. For instance, the production of porous Si particles may be accomplished by etching particles of a Si—Al alloy using HCl solution (to remove the Al element leaving behind pores) or by etching particles of a Si—$SiO_2$ mixture using HF solution (by removing $SiO_2$ to create pores).

Porous $SnO_2$ nanoparticles may be synthesized by a modified procedure described by Gurunathan et al [P. Gurunathan, P. M. Ette and K. Ramesha, *ACS Appl. Mater. Inter.*, 6 (2014) 16556-16564]. In a typical synthesis procedure, 8.00 g of $SnCl_2.6H_2O$, 5.20 g of resorcinol and 16.0 mL of 37% formaldehyde solution were mixed in 160 mL of $H_2O$ for about 30 minutes. Subsequently, the solution is sealed in a 250 mL round-bottom flask and kept in water bath at 80° C. for 4 hours. The resulting red gel is dried at 80° C. in an oven and calcined at 700° C. for 4 hours in $N_2$ and air atmosphere in sequence. Finally, the obtained white $SnO_2$ may be mechanically ground into finer powder for 30-60 minutes in mortar.

All types of porous anode active material particles may be produced by depositing the anode active material onto surfaces or into pores of a sacrificial material structure, followed by removing the sacrificial material. Such a deposition can be conducted using CVD, plasma-enhanced CVD, physical vapor deposition, sputtering, solution deposition, melt impregnation, chemical reaction deposition, etc.

Additionally, for the purpose of addressing the rapid battery capacity decay problems, the primary particles of anode active material may contain pre-lithiated particles. In other words, before the electrode active material particles (such as Si, Ge, Sn, $SnO_2$, $Co_3O_4$, etc.) are embedded in a sacrificial material matrix and then embraced by graphene sheets, these particles have already been previously intercalated with Li ions (e.g. via electrochemical charging).

In some embodiments, prior to the instant graphene production and impact transfer and embracing process, the primary particles of anode electrode active material (embedded in a conducting polymer network) contain particles that are pre-coated with a coating of a conductive material selected from carbon, pitch, carbonized resin, a conductive polymer, a conductive organic material, a graphene coating (e.g. graphene sheets), a metal coating, a metal oxide shell, or a combination thereof. The coating layer thickness is preferably in the range from 1 nm to 10 μm, preferably from 2 nm to 1 μm, and further preferably from 5 nm to 100 nm. This coating is implemented for the purpose of establishing a stable solid-electrolyte interface (SEI) to increase the useful cycle life of a lithium-ion battery. Coating of graphene sheets on anode active material particles may be accomplished by using a similarly configured impact transfer process (direct transfer or indirect transfer) as described above for the composite particles.

In some embodiments, the particles of solid anode active material contain particles that are, prior to being embedded in a conducting polymer network, pre-coated with a carbon precursor material selected from a coal tar pitch, petroleum pitch, mesophase pitch, polymer, organic material, or a combination thereof so that the carbon precursor material resides between surfaces of the solid electrode active material particles and the conducting polymer network, and the method further contains a step of heat-treating the micro-droplets of conducting polymer network-encapsulated anode active material particles to convert the carbon precursor material to a carbon material coated on primary active material particle surfaces.

The multi-functional particulates of graphene-encapsulated conducting polymer gel network-embedded anode particles may be exposed to a matrix or binder material (e.g. a conducting polymer) that chemically bonds the external graphene sheets together or simply fills the gaps between graphene sheets. The matrix/binder material helps to completely seal off the embracing graphene sheets to prevent direct contact of the embraced anode active material with liquid electrolyte, which otherwise can continue to form additional SEI via continuously consuming the lithium ions or solvent in the electrolyte, leading to rapid capacity decay.

In some embodiments, the method further comprises a step of exposing the graphene-embraced particulates to a liquid or vapor of a conductive material that is conductive to electrons and/or ions of lithium, sodium, magnesium, aluminum, or zinc. This procedure serves to provide a stable SEI or to make the SEI more stable.

The primary particles of anode active material may be selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; and combinations thereof.

Several micro-encapsulation processes require the polymer to be dissolvable in a solvent or its precursor (or monomer or oligomer prior) initially contains a liquid state (flowable). Fortunately, all the polymers used herein are soluble in some common solvents or the monomer or other polymerizing/curing ingredients are in a liquid state to begin with. Even for those rubbers that are not very soluble after vulcanization, the un-cured polymer (prior to vulcanization or curing) can be readily dissolved in a common organic solvent to form a solution. This solution can then be used to provide a mixture of anode active material particles and a polymer to embrace the carbon/graphite particles via several of the micro-encapsulation methods discussed in what follows.

There are three broad categories of micro-encapsulation methods that can be implemented to produce conducting polymer network embedded or encapsulated anode particles (the micro-droplets): physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the anode active material primary particles in a pan or a similar device while the encapsulating material (e.g.

monomer/oligomer liquid or polymer/solvent solution) is applied slowly until a desired encapsulating shell thickness is attained.

Air-suspension coating method: In the air suspension coating process, the solid primary particles of anode active material are dispersed into the supporting air stream in an encapsulating chamber. A controlled stream of a polymer-solvent solution (e.g. polymer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with polymer or reactive precursor (monomer, oligomer, etc. which is polymerized/cured concurrently or subsequently) while the volatile solvent is removed, leaving a thin layer of conducting network polymer on surfaces of the carbon/graphite particles. This process may be repeated several times until the required parameters, such as full-coating thickness (i.e. encapsulating shell or wall thickness), are achieved. The air stream which supports the anode particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Primary anode particles may be encapsulated with a polymer or precursor material using a rotating extrusion head containing concentric nozzles. In this process, a stream of core fluid (slurry containing anode particles dispersed in a solvent) is surrounded by a sheath of shell solution or melt containing the polymer or precursor. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle encapsulation method: Core-shell encapsulation or matrix-encapsulation of anode particles can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material particles and the polymer or precursor. The solidification can be done according to the used gelation system with an internal gelation.

Spray-drying: Spray drying may be used to encapsulate anode particles when the particles are suspended in a melt or polymer/precursor solution to form a suspension. In spray drying, the liquid feed (solution or suspension) is atomized to form droplets which, upon contacts with hot gas, allow solvent to get vaporized and thin polymer shell or matrix to fully embrace the particles. If pre-made graphene sheets are included in the suspension, the micro-droplets formed may contain Coacervation-phase separation: This process consists of three steps carried out under continuous agitation:
(a) Formation of three immiscible chemical phases: liquid manufacturing vehicle phase, core material phase and encapsulation material phase. The anode primary particles are dispersed in a solution of the encapsulating polymer or precursor. The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
(b) Deposition of encapsulation shell material: anode particles being dispersed in the encapsulating polymer solution, encapsulating polymer/precursor coated around anode particles, and deposition of liquid polymer embracing around anode particles by polymer adsorbed at the interface formed between core material and vehicle phase; and
(c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A suspension of the anode particles and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form a polymer shell material.

In-situ polymerization: In some micro-encapsulation processes, anode particles are fully coated with a monomer or oligomer first. Then, direct polymerization of the monomer or oligomer is carried out on the surfaces of these material particles.

Matrix polymerization: This method involves dispersing and embedding anode primary particles in a polymeric matrix during formation of the particles. This can be accomplished via spray-drying, in which the particles are formed by evaporation of the solvent from the matrix material. Another possible route is the notion that the solidification of the matrix is caused by a chemical change.

In the invented method (Approach 1), the graphitic material (as the graphene source) may be selected from natural graphite, synthetic graphite, highly oriented pyrolytic graphite, graphite fiber, graphitic nano-fiber, graphite fluoride, chemically modified graphite, meso-carbon micro-bead, partially crystalline graphite, or a combination thereof.

The energy impacting apparatus may be a vibratory ball mill, planetary ball mill, high energy mill, basket mill, agitator ball mill, cryogenic ball mill, micro ball mill, tumbler ball mill, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer. The procedure of operating the energy impacting apparatus may be conducted in a continuous manner using a continuous energy impacting device.

The following examples serve to provide the best modes of practice for the present disclosure and should not be construed as limiting the scope of the disclosure:

EXAMPLE 1

Production of Graphene-Embraced PEDOT:PSS-Embedded Anode Particulates

Several types of anode active materials in a fine powder form were investigated. These include $Co_3O_4$, Si, Ge, $SiO_x$ (0<x<2), etc., which are used as examples to illustrate the best mode of practice. These active materials were either prepared in house or purchased from commercial sources.

Poly(3,4-ethylenedioxythiophene):polystyrene sulfonate (PEDOT:PSS) is a polymer mixture of two ionomers. One component is made up of sodium polystyrene sulfonate, which is a sulfonated polystyrene. Part of the sulfonyl groups are deprotonated and carry a negative charge. The other component poly(3,4-ethylenedioxythiophene) or PEDOT is a conjugated polymer, polythiophene, which carries positive charges. Together the two charged polymers form a macromolecular salt. The PEDOT/PSS is initially soluble in water. If a curing agent is used, the polymer may be further cured to increase the degree of cross-linking.

Primary particles of an anode active material (e.g. Si particles 200 nm in diameter) were dispersed in a PEDOT/PSS-water solution to form a slurry (2-8% by wt. solid content), which was spray-dried to form micro-droplets of PEDOT/PSS-embedded anode active material particles. The micro-droplets were then subjected to a direct transfer or indirect transfer treatment for graphene sheet encapsulation of micro-droplets using natural graphite as the graphene source.

Subsequently, in a typical experiment, 1 kg of micro-droplets of PEDOT/PSS-embedded anode active material particles and 100 grams of natural flake graphite, 50 mesh (average particle size 0.18 mm; Asbury Carbons, Asbury N.J.), and milling balls (stainless steel balls, $ZrO_2$ balls, glass balls, and $MoO_2$ balls, etc.) were placed in a high-energy ball mill container or a tumbler ball mill. The tumbler ball mill was operated at 30 rpm for 3 to 8 hours. The high-intensity ball mill was operated at 100 rpm for 0.5 to 3 hours. The container lid was then removed and particles of the active materials were found to be fully coated (embraced or encapsulated) with a dark layer, which was verified to be graphene by Raman spectroscopy. The mass of processed material was placed over a 50 mesh sieve and, in some cases, a small amount of unprocessed flake graphite was removed.

A sample of the graphene-coated micro-droplets was then immersed in water at 80° C. for 2 hours under the influence of a tip ultrasonicator to dissolve PEDOT/PSS and allow isolated/separated graphene sheets to disperse in water for the purpose of determining the nature of graphene sheets produced. After solvent removal, isolated graphene sheet powder was recovered and was found to be mostly few-layer graphene sheets.

In a separate experiment, the same batch of PEDOT/PSS-anode particles and flake graphite particles (without the impacting steel balls) were placed in the same high-energy ball mill container and the ball mill was operated under the same conditions for the same period of time. The results were compared with those obtained from impacting ball-assisted operation. The separate graphene sheets isolated from PEDOT/PSS particles, upon PEDOT/PSS dissolution, are mostly single-layer graphene. The graphene particulates produced from this process have a higher level of porosity (lower physical density).

On a separate basis, the invented Approach 2 was executed. Primary particles of an anode active material (e.g. Si particles 200 nm in diameter) and pre-made graphene sheets (e.g. GO sheets) were dispersed in a PEDOT/PSS-water solution to form a slurry (2-8% by wt. solid content), which was spray-dried to form micro-droplets of PEDOT/PSS-embedded anode active material particles. The micro-droplets also contain graphene sheets embracing exterior surfaces.

Although PEDOT/PSS is herein used as an example of water-soluble polymer, the binder material for graphene particulate production is not limited to PEDOT/PSS. It does not have to be a water-soluble polymer either.

EXAMPLE 2

Graphene-Protected Anode Particulates Containing Sn, $SiO_x$, and Ge Primary Particles and Si Nanowires Embedded in Polypyrrole (PPy) Gel Network The process of example 1 was replicated with PEDOT/PSS being replaced by polypyrrole (PPy) network. The polypyrrole hydrogel was prepared by following the following procedure: Solution A was prepared by mixing 1 mL $H_2O$ and 0.5 mL phytic acid together and then injecting 142 µL pyrrole into the solution, which was sonicated for 1 min. Solution B was prepared by dissolving 0.114 g ammonium persulfate in 0.5 mL $H_2O$. The solution A and B were separately cooled to 4° C. and then solution B was added into solution A quickly to form a reacting precursor solution.

The Sn, $SiO_x$, and Ge primary particles were separately dispersed in a reacting precursor solution, along with optional graphene sheets (Approach 2), to form a suspension, which was rapidly spray-dried to form micro-droplets. For Approach 1, these micro-droplets contain anode active material primary particles embedded in polypyrrole hydrogel. For Approach 2, these micro-droplets contain both anode active material primary particles and graphene sheets embedded in polypyrrole hydrogel. The micro-droplets were partially or totally dried by removing portion or all of the water content from the gel under vacuum at 60° C. For Approach 2, some exterior graphene sheets were already present around the micro-droplets.

For Approach 1, partially or totally dried micro-droplets were then subjected to a direct transfer or indirect transfer treatment to produce graphene-embraced anode material-decorated particles.

In a separate experiment, carbon-coated Si nanowires (available from Angstron Energy Co., AEC, Dayton, Ohio) were subjected to electrochemical pre-lithiation to prepare several samples containing from 5% to 54% Li. Pre-lithiation of an electrode active material means the material is intercalated or loaded with lithium before a battery anode or cell is made. Various pre-lithiated Si particle-decorated natural graphite particles were then subjected to the presently invented graphene encapsulation treatment. The resulting graphene-encapsulated conducting polymer gel network-embedded pre-lithiated Si nanowires were incorporated as an anode active material in several lithium-ion cells.

In yet another experiment, porous Si particles were prepared by using HCl to etch out Al in a Si—Al alloy (80% Al alloyed with 20% Si). Etching and leaching out Al produces pores inside Si particles and on Si particle surfaces. These porous Si particles were then used in the preparation of the multi-functional particulates.

EXAMPLE 3

Production of Graphene-Protected Polyaniline Gel Network-Encapsulated Anode Particles In some embodiments, the precursor may contain a monomer, an initiator or catalyst, a crosslinking or gelating agent, an oxidizer and/or dopant. As an example, 3.6 ml solution A, which contains 400 mM aniline monomer and 120 mM phytic acid, was added and mixed with 280 mg Si nanoparticles or $SnO_2$ nanoparticles and optionally 40 mg graphene oxide sheets. Subsequently, 1.2 ml solution B, containing 500 mM ammonium persulfate, was added into the above mixture and subjected to bath sonication for 1 min. The mixture suspension was spray-dried to form micro-droplets. In about 2-3 min, the solution changed color from brown to dark green and became viscous and gel-like, indicating in-situ polymerization of aniline monomer to form the PANi hydrogel.

The micro-droplets, with or without the presence of GO sheets, were then vacuum-dried at 50° C. for 24 hours to obtain PANi network polymer-encapsulated anode particles. Then, in an experiment, 100 grams of the dried micro-droplets were placed in a plastic container along with 5 grams of expanded graphite powder (as a graphene source). This container was part of an attritor mill, which was operated for 30 minutes-2 hours. After processing, the composite particles were found to be coated with a thin layer of graphene-like material.

The resulting multi-functional particulates (graphene-encapsulated PANi network polymer-embedded anode particles), along with a SBR binder, and Super-P conductive additive were then made into an anode electrode.

EXAMPLES 4

Heparin-Based Material as a Curing Agent for the Preparation of a Conducting Polymer Network The encapsulating conducting polymer may be produced from a monomer using heparin-based crosslinking or gelating agent (e.g. in addition to phytic acid). Aqueous solutions of heparin (0.210% w/w) were prepared using 5M NaOH. Photo-cross-linkable heparin methacrylate (Hep-MA) precursors were prepared by combining heparin (porcine source, Mw~1719 kDa) incubated with methacrylic anhydride (MA) and adjusted to pH=8. The degree of substitution (DS) of methacrylate groups covalently linked to heparin precursors was measured by 1H nuclear magnetic resonance. The DS was determined from integral ratios of peaks of the methacrylate groups at 6.2 ppm compared to peak corresponding to methyl groups in heparin at 2.05 ppm.

Solutions used for photopolymerization were incubated with 2-methyl-1-[4-(hydeoxyethoxy)phenyl]-2-methyl-1-propanone (Irgacure 2959) to create final concentrations of 0.5% (w/w) of photoinitiator. Gels were photo-cross-linked using UV illumination for 30-60 min ($\lambda$ max=365 nm, 10 mW/cm$^2$). Hep-MA/PANI dual-networks were formed by sequentially incubating cross-linked Hep-MA hydrogels in aqueous solutions of ANI ([ANI]$_0$, between 0.1 and 2 M, 10 min) and acidic solutions of APS ([APS]$_0$, between 12.5 mM and 2 M, 20120 min). The gel fraction of Hep-MA/PANI dual networks was recovered by washing in di $H_2O$ after oxidative polymerization.

EXAMPLES 5

Preparation of Graphene Fluoride Anode Particulates

In a typical procedure, a powder mass of multi-functional particulates prepared in Example 1 or 2 was fluorinated by vapors of chlorine trifluoride in a sealed autoclave reactor to yield fluorinated graphene hybrid particulates. Different durations of fluorination time were allowed for achieving different degrees of fluorination. Compared to pristine graphene and reduced graphene oxide-based porous particulates, the graphene fluoride-protected particulates were found to be more chemically compatible with some commonly used electrolytes in lithium-ion battery industry.

EXAMPLE 6

Preparation of Graphene Oxide Anode Particulates and Nitrogenated Graphene Anode Particulates Several samples of porous graphene particulates, containing non-prelithiated anode active material particles, prepared in Example 2 were immersed in a 30% $H_2O_2$-water solution for a period of 2-48 hours to obtain particulates containing an encapsulating shell of graphene oxide (GO) sheets, having an oxygen content of 2-25% by weight.

Some porous GO particulates were then mixed with different proportions of urea and the mixtures were heated in a microwave reactor (900 W) for 0.5 to 5 minutes. The products were washed several times with deionized water and vacuum dried. The products obtained were porous nitrogenated graphene particulates. The nitrogen contents in the encapsulating shell of nitrogenated graphene sheets were from 3 wt. % to 17.5 wt. %, as measured by elemental analysis.

EXAMPLE 7

Preparation and Electrochemical Testing of Various Battery Cells

For most of the anode and cathode active materials investigated, we prepared lithium-ion cells or lithium metal cells using the conventional slurry coating method. A typical anode composition includes 85 wt. % active material (e.g., multi-functional graphene particulates containing Si or $Co_3O_4$ particles), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. The cell is then injected with 1 M LiPF$_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

Figure 5:
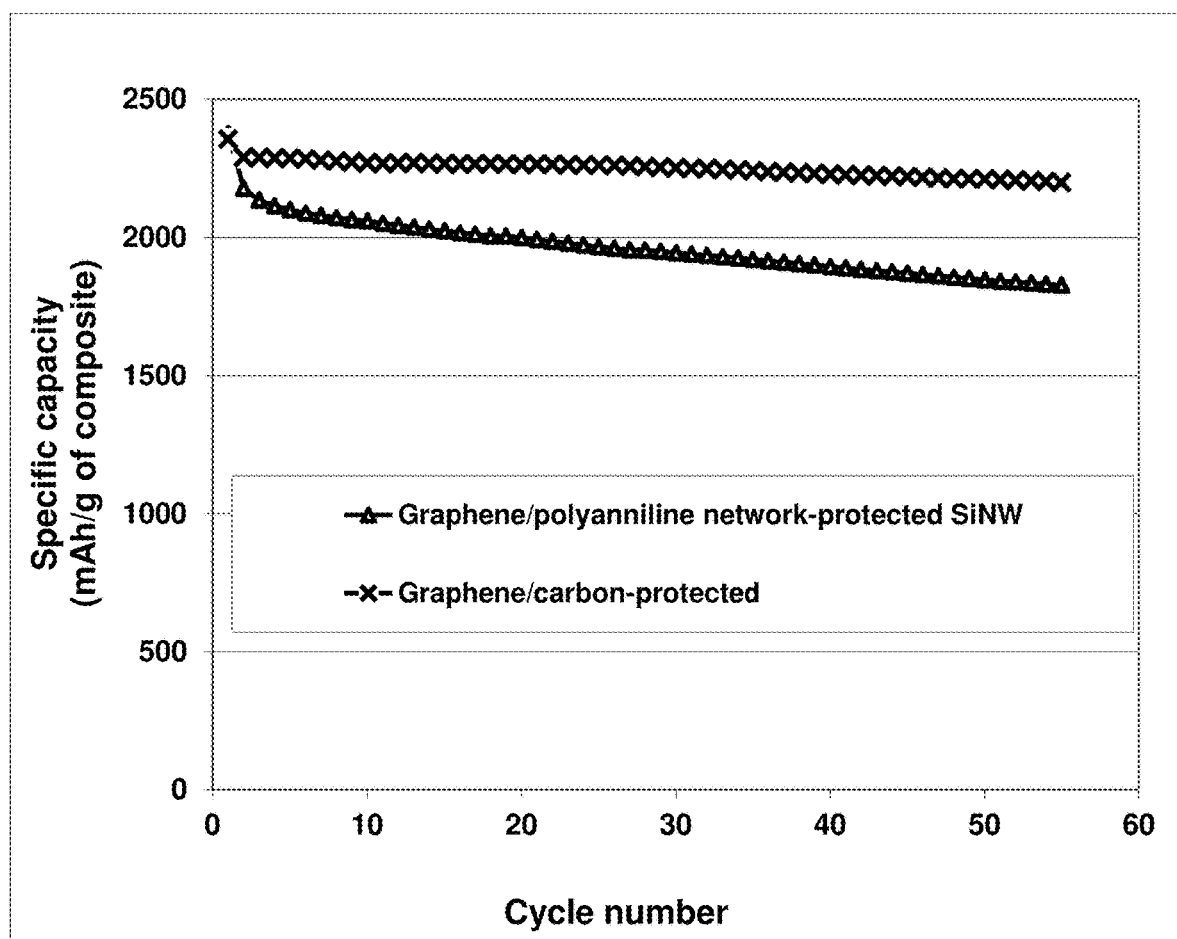
FIG. 5 The cycling behaviors of two lithium-ion cells: one featuring an anode containing graphene-protected, polyaniline network-encapsulated Si nanowires as the anode active material and the other graphene-protected, amorphous carbon-encapsulated Si nanowires as the anode active material.

FIG. 5 shows the cycling behaviors of two lithium-ion cells: one featuring an anode containing graphene-protected, polyaniline network-encapsulated Si nanowires as the anode active material and the other graphene-protected, amorphous carbon-encapsulated Si nanowires as the anode active material. This is but one of the many examples that have demonstrated that the presently invented graphene-protected, conducting polymer network-encapsulated anode particles imparts significantly more stable charge/discharge cycle stability to a lithium-ion battery.

In lithium-ion battery industry, it is a common practice to define the cycle life of a battery as the number of charge-discharge cycles that the battery suffers 20% decay in capacity based on the initial capacity measured after the required electrochemical formation. We have made the following observations:
  (a) In general, we have observed that graphene encapsulation and conducting polymer network embedding leads to a significantly higher cycle life of a lithium-ion battery featuring a high-capacity anode active material.
  (b) An electron-conducting polymer used to bond exterior graphene sheets can further enhance the cycling stability of the battery.
  (c) Porous anode active material particles lead to more stable cycling behaviors.

The invention claimed is:

1. A method of producing multi-functional particulates of graphene-protected conducting polymer gel network-encapsulated anode particles for a lithium battery, said method comprising:
  A) providing particulates of conducting polymer gel network-encapsulated anode active material particles, wherein one or a plurality of primary particles of an anode active material, having a diameter or thickness from 0.5 nm to 20 µm, is encapsulated by or embedded in an electrically and/or ionically conducting polymer gel network;
  B) embracing said particulates of conducting polymer gel network-encapsulated anode active material particles with a shell of multiple graphene sheets, having a thickness from 0.5 nm to 10 µm, to produce said multi-functional particulates, having a diameter from 100 nm to 100 µm; and
  C) wherein the conducting polymer gel network contains a conjugated polymer selected from Poly(isothianaphthene), Poly(2,5-dialkoxy) paraphenylene vinylene, Poly[(1,4-phenylene-1,2-diphenylvinylene)], Poly(3', 7'-dimethyloctyloxy phenylene vinylene), Polyparaphenylene sulphide, Polyheptadiyne, Poly(3-octylthiophene), Poly(3-cyclohexylthiophene), Poly(3-methyl-4-cyclohexylthiophene), Poly(2,5-dialkoxy-1,4-phenyleneethynylene), Poly(2-decyloxy-1,4-phenylene), Poly(9,9-dioctylfluorene), Polyquinoline, a derivative thereof, a copolymer thereof, a sulfonated version thereof, or a combination thereof.

2. The method of claim 1, where said particulates of conducting polymer gel network-encapsulated anode active material particles provided in step (A) are produced by operating a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, or a combination thereof.

3. The method of claim 1, where said step (B) comprises conducting spray-drying, fluidized bed coating, or air-suspension coating to embrace or encapsulate said particulates of conducting polymer gel-encapsulated anode active material particles with multiple graphene sheets to produce said graphene-embraced anode particulates.

4. The method of claim 1, wherein multiple graphene sheets contain single-layer or few-layer graphene, wherein said few-layer graphene sheets have 2-10 layers of stacked graphene planes having an inter-plane spacing $d_{002}$ from 0.3354 nm to 0.6 nm as measured by X-ray diffraction and said single-layer or few-layer graphene sheets contain a pristine graphene material having essentially zero % of non-carbon elements, or a non-pristine graphene material having 0.001% to 25% by weight of non-carbon elements.

5. The method of claim 4, wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

6. The method of claim 1, wherein said step (B) comprises:
  i) mixing multiple particles of a graphitic material, said particulates of conducting polymer gel network-encapsulated anode active material particles, and optional milling balls or beads, to form a mixture in an impacting chamber of an energy impacting apparatus;
  ii) operating said energy impacting apparatus with a frequency and an intensity for a length of time sufficient for peeling off graphene sheets from said particles of graphitic material and transferring said peeled graphene sheets to surfaces of said particulates of conducting polymer gel network-encapsulated anode active material particles to produce said multi-functional particulates; and
  iii) recovering said multi-functional particulates from said impacting chamber and separating said milling balls from said multi-functional particulates.

7. The method of claim 6, wherein said particles of ball-milling media contain milling balls selected from ceramic particles, including $ZrO_2$ and non-$ZrO_2$ metal oxide particles, metal particles, glass particles, polymer particles, or a combination thereof.

8. The method of claim 6, wherein said energy impacting apparatus is selected from a double cone mixer, double cone blender, vibratory ball mill, planetary ball mill, high energy mill, basket mill, agitator ball mill, cryogenic ball mill, micro ball mill, tumbler ball mill, attritor, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer.

9. The method of claim 6, wherein said graphitic material is selected from natural graphite, synthetic graphite, highly oriented pyrolytic graphite, graphite fiber, graphitic nano-fiber, graphite fluoride, chemically modified graphite, mesocarbon micro-bead, partially crystalline graphite, or a combination thereof.

10. The method of claim 6, wherein said procedure of operating said energy impacting apparatus is conducted in a continuous manner using a continuous energy impacting device.

11. The method of claim 1, further comprising a step of pre-loading from 0.1% to 54.7% by weight of lithium ions into said primary particles of anode active material prior to step (A) or step (B), or after step (B).

12. The method of claim 1, wherein said anode active material primary particles are selected from the group consisting of:
(A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), niobium (Nb), and cadmium (Cd);
(B) lithiated and un-lithiated alloys or intermetallic compounds of Si, Ge, Sn, Pb, Sb, Bi, Zn, Al, Ti, Ni, Co, Nb, or Cd with other elements;
(C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites;
(D) lithiated and un-lithiated salts and hydroxides of Sn;
(E) lithium titanate, lithium manganate, lithium aluminate, lithium-containing titanium oxide, lithium niobium oxide, lithium transition metal oxide;
and combinations thereof.

13. The method of claim 1, wherein said anode active material particles are porous having surface pores, internal pores, or both surface and internal pores.

14. The method of claim 1, wherein said anode active material particles include powder, flakes, beads, pellets, spheres, wires, fibers, filaments, discs, ribbons, or rods, having a diameter or thickness from 2 nm to 100 nm.

15. The method of claim 1, further comprising a step of incorporating said multi-functional particulates into a battery anode electrode.

* * * * *